United States Patent
Lo et al.

(10) Patent No.: US 6,694,381 B1
(45) Date of Patent: *Feb. 17, 2004

(54) PLATFORM-INDEPENDENT COMMUNICATIONS PROTOCOL SUPPORTING COMMUNICATIONS BETWEEN A PROCESSOR AND SUBSYSTEM CONTROLLER

(75) Inventors: Horatio Lo, Milpitas, CA (US); David Lee, San Jose, CA (US)

(73) Assignee: Vicom Systems, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,027

(22) Filed: Mar. 10, 2000

Related U.S. Application Data (63) Continuation of application No. 08/992,202, filed on Dec. 17, 1997, now Pat. No. 6,078,968.

(51) Int. Cl.[7] .................................................. G06F 3/00
(52) U.S. Cl. ........................ 710/5; 710/3; 710/4; 710/11; 710/30
(58) Field of Search .............................. 710/5, 11, 3, 4, 710/30

(56) References Cited

U.S. PATENT DOCUMENTS

| | | | |
|---|---|---|---|
| 4,807,121 A | 2/1989 | Halford | 364/200 |
| 5,363,484 A | 11/1994 | Desnoyers et al. | 395/200 |
| 5,418,960 A | 5/1995 | Munroe | 395/700 |
| 5,421,014 A | 5/1995 | Bucher | 395/650 |
| 5,724,599 A | 3/1998 | Balmer et al. | 395/800 |
| 6,038,400 A | * 3/2000 | Bell et al. | 710/11 |

* cited by examiner

Primary Examiner—Kim Huynh
Assistant Examiner—Harold Kim
(74) Attorney, Agent, or Firm—Campbell Stephenson Ascolese LLP; Samuel G. Campbell, III (57) ABSTRACT

A method and apparatus implement a communications protocol whereby a host application program can communicate with a computer subsystem without the use of special driver software. In this way, the application program is able to invoke virtually any vendor-unique function on a compatible subsystem controller using only standard read/write system calls. This avoids platform dependency and greatly improves the portability of the application program.

55 Claims, 5 Drawing Sheets

PLATFORM-INDEPENDENT COMMUNICATIONS PROTOCOL SUPPORTING COMMUNICATIONS BETWEEN A PROCESSOR AND SUBSYSTEM CONTROLLER

This application is a continuation of Ser. No. 08/992,202 filed Dec. 17, 1997 now U.S. Pat. No. 6,078,968.

BACKGROUND OF THE INVENTION

The present invention relates to computer subsystems. More particularly, the present invention relates to a method and apparatus for communicating with one or more computer subsystems via a platform-independent communication protocol.

The need for increasingly powerful computer subsystems has mandated the development of increasingly sophisticated computer peripheral devices to off-load tasks from the host computer's central processing unit (CPU). Examples include storage subsystems, graphics controllers, and network interface controllers, among others. Because such subsystems are often critical to the host system's performance, the transfer of information between the CPU and its subsystems should incur as little overhead as reasonably possible. Further, it is preferable to maintain simplicity in the hardware used to communicate between the CPU and the subsystem, both for reasons of cost and reliability. Finally, a flexible approach which is not dependent on specific features of the given computing platform or operating system (OS) is also desirable.

When designing a controller for a computer subsystem (e.g., an intelligent small computer systems interface (SCSI) controller for a storage subsystem), it is thus generally desirable to offer the capability to communicate with that subsystem in a manner that meets the foregoing criteria. For example, this might take the form of controlling/configuring various features of the subsystem by sending commands from the host computer. The ability to monitor the health and/or performance of the subsystem from the host is also often desired.

Using the intelligent SCSI subsystem as an example, it can be seen that historically, the foregoing types of vendor-unique features have been implemented using some non-standard SCSI commands (e.g., Send Diagnostic and Receive Diagnostic commands). This approach, while straightforward, forces a software implementation of such functionality that is highly host-dependent. Moreover, the way in which an application program requests a SCSI driver to send these types of vendor-unique commands is in no way standardized in the industry. Therefore, new driver software modules must repeatedly written and re-written for the many different platforms and OSs commonly in use today. This repeated effort is a drain on the resources of those creating such software applications.

What is therefore desirable is a method and apparatus which permits an application program to communicate with a computer subsystem without the use of driver software written especially for supporting communications on a specific platform.

SUMMARY OF THE INVENTION

The present invention provides techniques that allow a host application to communicate with one or more computer subsystems via a communication protocol that is platform independent.

A method and apparatus according to the present invention implement a communications protocol whereby a host application program can communicate with a computer subsystem without the use of special driver software. In this way, the application program is able to invoke virtually any function on a compatible subsystem controller using only standard read/write system calls. This avoids platform dependency, greatly improving the portability of an application program using this technique.

One aspect of the present invention provides a computer-implemented method for communicating between a CPU and a subsystem. Communications according to the method of the present invention begin by writing a data packet to the subsystem. The data packet includes a signature and an identifier. The signature uniquely identifies the command as being a command to the subsystem under a protocol of the present invention. If information is to be returned from the subsystem, the central processing unit reads from the subsystem using the identifier. As with the signature, the use of this identifier indicates that the read is requesting the information generated by the last command whose data has not yet been read.

When a write is performed, the subsystem first detects the signature. Data which might be a command may be constantly checked by the subsystem to determine if the data being sent is indeed a command. Alternatively, only a subset of such commands might be checked. When such a signature is detected, the subsystem stores the identifier. This allows any accesses using the identifier to be classified as a subsystem command. Alternatively, when the central processing unit sends a read command to the subsystem that reads from a location identified by the identifier, the read is detected by analyzing the read command's identifier. When such a read command is detected, the requisite information is returned from the subsystem to the central processing unit.

A further understanding of the nature and advantages of the invention described herein may be realized by reference to the remaining portions of the specification and the attached drawings.

DESCRIPTION OF THE SPECIFIC EMBODIMENTS

Introduction

The present invention supports communication with a computer subsystem (e.g., a hard disk subsystem) by allowing the transfer of information using a communication protocol that obviates the need for a software driver to communicate with the subsystem. Application programs and subsystems employing the method of the present invention require no special driver software in order to communicate because such an application communicates directly with the subsystem by writing to and reading from conventional OS constructs such as partitions and files. This allows the subsystem communication source code to be run on multiple computing platforms (i.e., in a platform-independent manner) simply by recompiling that source code. No rewriting of the subsystem communication source code is required, as must often be done with current techniques. And, unlike current techniques, no new driver software need be created to operate an application's subsystem communication code on a new computing platform.

General Architecture

Figure 1:
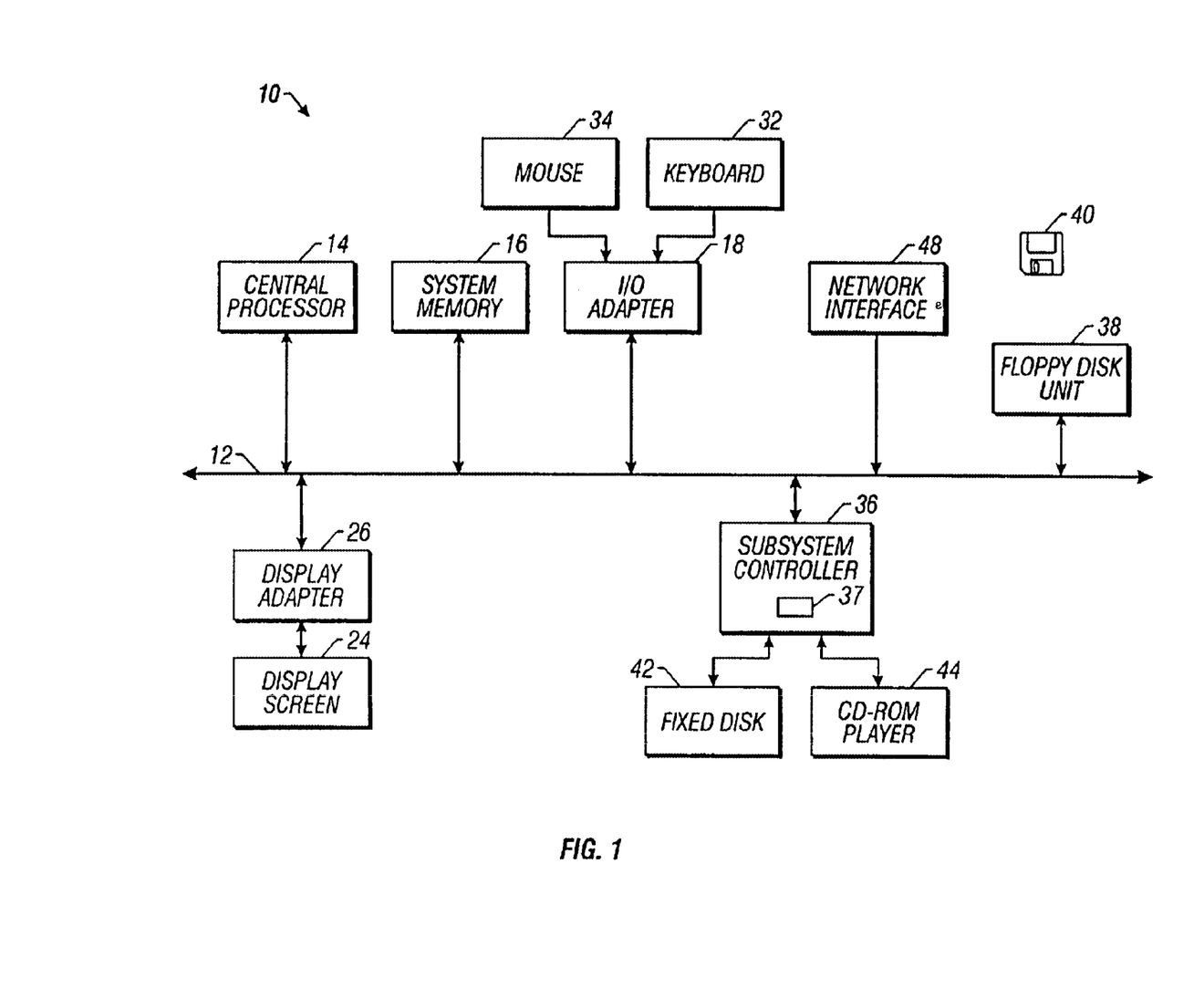
FIG. 1 depicts a block diagram of a host computer system 10 suitable for implementing the present invention or being connected in a network implementing the present invention.

An application according to the present invention is configured to run on a host computer 10, and permit host computer 10 to communicate with one or more of its subsystems using the method of the present invention. Host computer system 10 includes a bus 12 which interconnects major subsystems such as a central processing unit (CPU) 14, a system memory 16 (e.g., dynamic random-access memory or DRAM), an input/output (I/O) adapter 18, an external device such as a display screen 24 via display adapter 26, a keyboard 32 and a mouse 34 via I/O adapter 18, and a subsystem controller 36. A floppy disk drive 38 operative to receive a floppy disk 40 is also provided.

Subsystem controller 36 contains a recognition unit 37, which is capable of recognizing the subsystem protocol commands of the present invention. Recognition unit 37 may be configured to analyze all commands sent to subsystem controller 36, in which case recognition unit 37 is in the data and control paths. Alternatively, data and control information may be passed to both recognition unit 37 and the device(s) being controlled. A further possibility is performing the analysis of commands in firmware. These alternatives are described further in relation to FIGS. 2B and 2C, below. Subsystem controller 36 may serve as an interface controller for a fixed disk drive 42 or a CD-ROM player 44, for example. CD-ROM player 44 is operative to receive a CD-ROM 46. Fixed disk 42 may be a part of host computer system 10 or may be separate and accessed through other interface systems. A network interface 48 may provide a connection to a LAN or to the Internet, for example. Many other devices or subsystems (not shown) may be connected in a similar manner.

With regard to the present invention, subsystem controller 36, for example, might be a SCSI interface controller that supports the usual SCSI command set, in addition to the commands of the present invention. Such commands, and descriptions of normal SCSI operations, are included in "The Book of SCSI: A Guide for Adventurers" by Peter M. Ridge, and David Deming (No Starch Printers; April 1995; ISBN: 1886411026) and "SCSI: Understanding the Small Computer System Interface" from NCR Corporation (Prentice Hall Computer Books; Jan. 1, 1990; ISBN: 0137968558), which are included herein by reference.

Also, it is not necessary for all of the devices shown in FIG. 1 to be present to practice the present invention. Moreover, the devices and subsystems shown in FIG. 1 may be interconnected in different ways from that illustrated. The operation of a computer system such as host computer 10 is readily known in the art and is not discussed in detail in this application. Code that employs the present invention may be operably disposed or stored in computer-readable storage media such as system memory 16, fixed disk 42, CD-ROM 46, or floppy disk 40. A software application may employ a communication protocol according to the present invention to communicate with any of the subsystems illustrated above, and others.

Figure 2A:
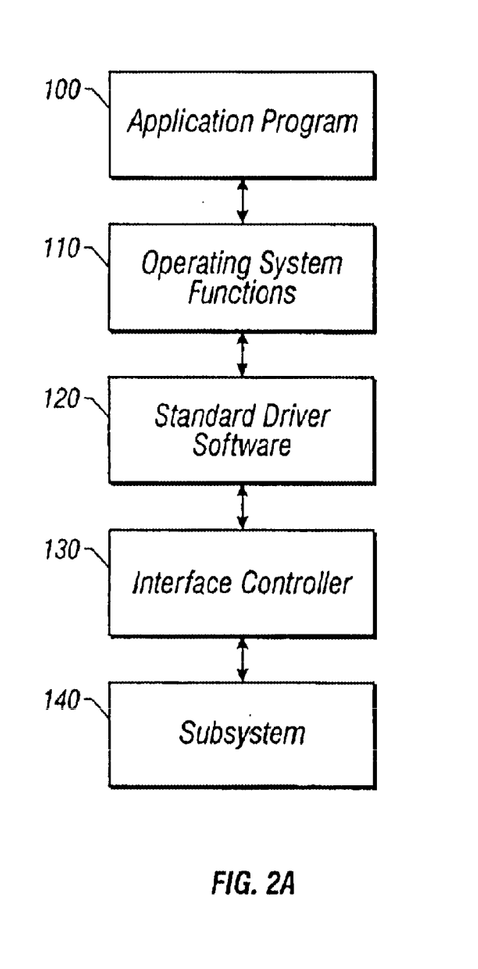
FIG. 2A depicts a platform-independent subsystem protocol in accordance with one embodiment of the present invention.

FIG. 2A depicts a block diagram of the software and hardware modules that communicate in a system of the present invention. An application program 100 containing the functionality provided by the present invention (i.e., compiled source code, generated according to the present invention) is loaded onto host computer 10 by downloading the program to fixed disk 42. Application program 100 is run on CPU 14, and allows CPU 14 to communicate with certain of the various subsystems in host computer 10 without the need for special driver software.

In normal operation, application program 100 performs writes and reads by calling operating system functions 110. Operating system functions 110 are standard functions of the given operating system running on host computer 10 that read data from and write data to one or more subsystems of host computer 10. For example, these functions might be the routines which read and write files on fixed disk 42. Alternatively, they might be routines which read and write raw block data, in a UNIX-type operating system environment. In a UNIX environment, a separate disk partition might be employed to hold the area written to and read from, when communicating with the subsystem.

Subsequently, operating system functions 110 communicate with standard driver software 120, which is provided with the operating system (or the subsystem) to support communication between the operating system and the given subsystem. Standard driver software 120 communicates the commands (and any associated data) through an interface controller 130 (e.g., subsystem controller 36 of FIG. 1) to a subsystem 140 (e.g., fixed disk drive 42 of FIG. 1). While it is shown as a single block, interface controller 130 may actually consist of several hardware modules. For example, in a SCSI environment, interface controller 130 would preferably include a SCSI host adapter and hard disk controller card with the recognition circuitry of the present invention (e.g., recognition unit 37 of FIG. 1) situated in the controller card. However, such recognition circuitry may reside on any of the hardware modules within interface controller 130. Because, in the usual case, the information being communicated is not protocol information, interface controller 130 merely passes the commands and data through to the device being controlled. Interface controller 130 may include a recognition unit such as recognition unit 37 of FIG. 1.

Figure 2B:
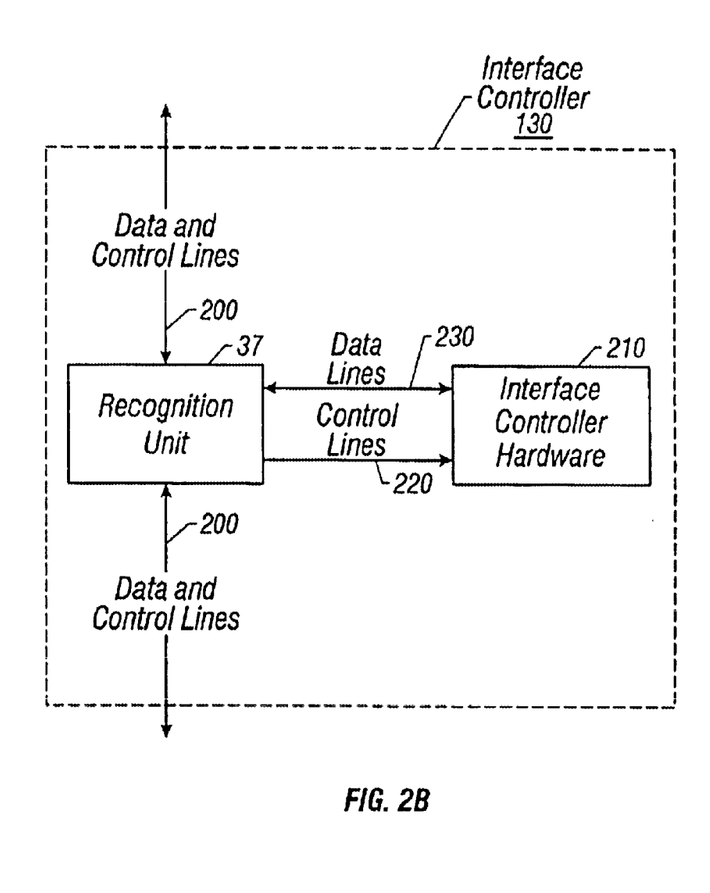
FIG. 2B depicts one embodiment of an interface controller of the present invention.

FIG. 2B illustrates one embodiment of interface controller 130, exemplified by subsystem controller 36. In this embodiment, the recognition circuitry of the present invention, exemplified by recognition unit 37, is an integral part of data and control lines 200. In this configuration, recognition unit 37 receives commands from standard driver software 120 and analyzes these commands to determine if they are subsystem protocol commands, or simply commands for one of the devices being controlled. This may be done using a comparator and two registers. The first register holds a signature that one or more of the subsystem protocol commands will contain (the use of signatures and other designations of the present invention are described later). The second register contains a portion of the command being analyzed which is expected to contain the subsystem protocol command signature. The outputs of the two registers are fed into the comparator, which subsequently indicates whether the information in the second register is the signature sought, and that the command being analyzed is indeed a subsystem protocol command. If a signature is identified, the command is passed to interface controller hardware 210. Otherwise, the command (and associated data, if any) is passed to subsystem 140.

To minimize the overhead involved in analyzing every command from standard driver software 120, recognition unit 37 may be configured to analyze only a subset of the possible commands sent to interface controller 130, based on one or more features of the commands which might possibly be sent (e.g., command length). In the configuration shown in FIG. 2B, when recognition unit 37 receives a subsystem protocol command, the subsystem protocol command is passed to interface controller hardware 210 over control lines 220. Associated data, if any, is passed to interface controller hardware 210 over data lines 230. Alternatively, control lines 220 and data lines 230 may be combined into a bus over which data and control information are passed.

Figure 2C:
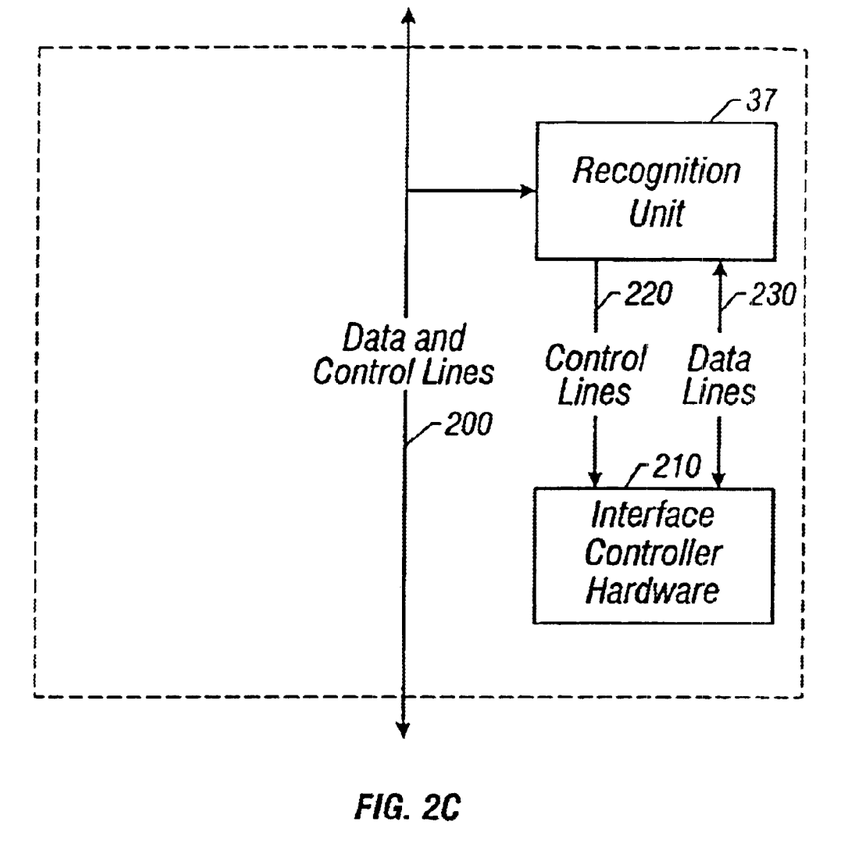
FIG. 2C depicts another embodiment of an interface controller of the present invention.

FIG. 2C illustrates an alternative embodiment of interface controller 130 in which the communications are passed to both recognition unit 37 and subsystem 140 in parallel. In that case, recognition unit 37 simply monitors the communications between standard driver software 120 and interface controller 130. In this configuration, recognition unit 37 passes a subsystem protocol command to interface controller hardware 210 when protocol communications occur. The subsystem protocol command is passed to interface controller hardware 210 over control lines 220. Associated data, if any, is passed to interface controller hardware 210 over data lines 230. Alternatively, control lines 220 and data lines 230 may be combined into a bus over which data and control information are passed, as noted above. Subsystem 140 would thus ignore communications so identified, for example, by means of a tristate technique, in order to electrically disconnect subsystem 140 from interface controller 130.

Another alternative, although not illustrated, is the use of firmware routines in interface controller 130 to perform the requisite analysis of commands passed to interface controller by standard driver software 120. Assuming interface controller hardware of interface controller 130 would normally be capable of monitoring the data/control streams passing through it, the interface controller hardware's firmware could be configured to analyze commands issued by standard driver software 120. Subsystem protocol commands would then be executed by the interface controller hardware, and non-protocol commands passed to subsystem 140.

Application program 100 communicates with interface controller 130 by writing a data packet to interface controller 130 which includes a signature and an identifier. Interface controller 130 analyzes some or all of the traffic between application program 100 (and so standard driver software 120) and subsystem 140. When a write command containing the given signature is detected, that command is acted upon by interface controller 130, and is not passed to subsystem 140. If results are generated by the write command, a read command may be issued to retrieve that information. The read command contains the identifier used by the write command, and so is itself identified. Normally, this identifier will indicate an address in either the memory or I/O space of host computer 10, or the memory or I/O space of the subsystem. For example, a logical block address (LBA) of a file or partition in a storage subsystem (e.g., fixed disk 42) could be used as the identifier. Application program 100 could thus write to a specific file, and in response, interface controller would use the LBA of that file for purposes of communicating with host computer 10.

A primary advantage of this technique is the ability to send information to and from a subsystem without the need for platform-specific driver software. This is a departure from the conventional approach in which platform-specific driver software is written specifically to allow application software to communicate with the subsystem's controller. Because the present invention uses standard drivers (i.e., those that are provided with a given operating system or with the interface controller), application program 100 is platform independent, and need only be recompiled to run on other platforms (assuming the portions of application program 100 other than those of the present invention are similarly portable). Because the present invention obviates the need for the platform-specific driver software required by conventional methods, no driver installation procedure need be performed, simplifying application installation and system maintenance. Another advantage of this technique is that if write and read commands are issued in pairs, changes in the identifier between the issuance of these pairs can occur without causing any problems.

The subsystem communication protocol of the present invention supports communication between a host CPU and a subsystem connected thereto by allowing a write command to be identified as being a subsystem command (and not the usual writing of data). Information carried in the write command allows one or more subsequent read commands (and optionally, other write commands) to be identified as subsystem protocol commands.

In one embodiment, a pair of standard write-read commands are used, and form a complete subsystem protocol transaction. The subsystem control command and parameters are embedded inside the data of the write command. The status and data to be returned to the host from the subsystem controller are embedded inside the data of the read command in a similar manner. Such write and read commands are referred to herein as subsystem protocol commands.

Distinguishing subsystem protocol commands from normal read and write commands must therefore be accomplished to successfully employ the method of the present invention. For example, subsystem protocol commands may be distinguished from normal commands by using a signature pattern. In a subsystem protocol write command, the signature pattern is embedded in the data. This signature is then matched with the signature pattern held in the subsystem controller. In this manner, the subsystem controller recognizes the write command as a subsystem protocol command. The probability of mistaking a normal write command for a subsystem protocol write command can be made arbitrarily small by increasing the length of the signature pattern. However, the preceding embodiment requires the subsystem controller to examine the data of every write command, which could adversely affect the subsystem's performance (especially if a long signature were used). Alternatively, a discernible subset of the possible write commands could be checked, reducing this overhead.

Figure 3:
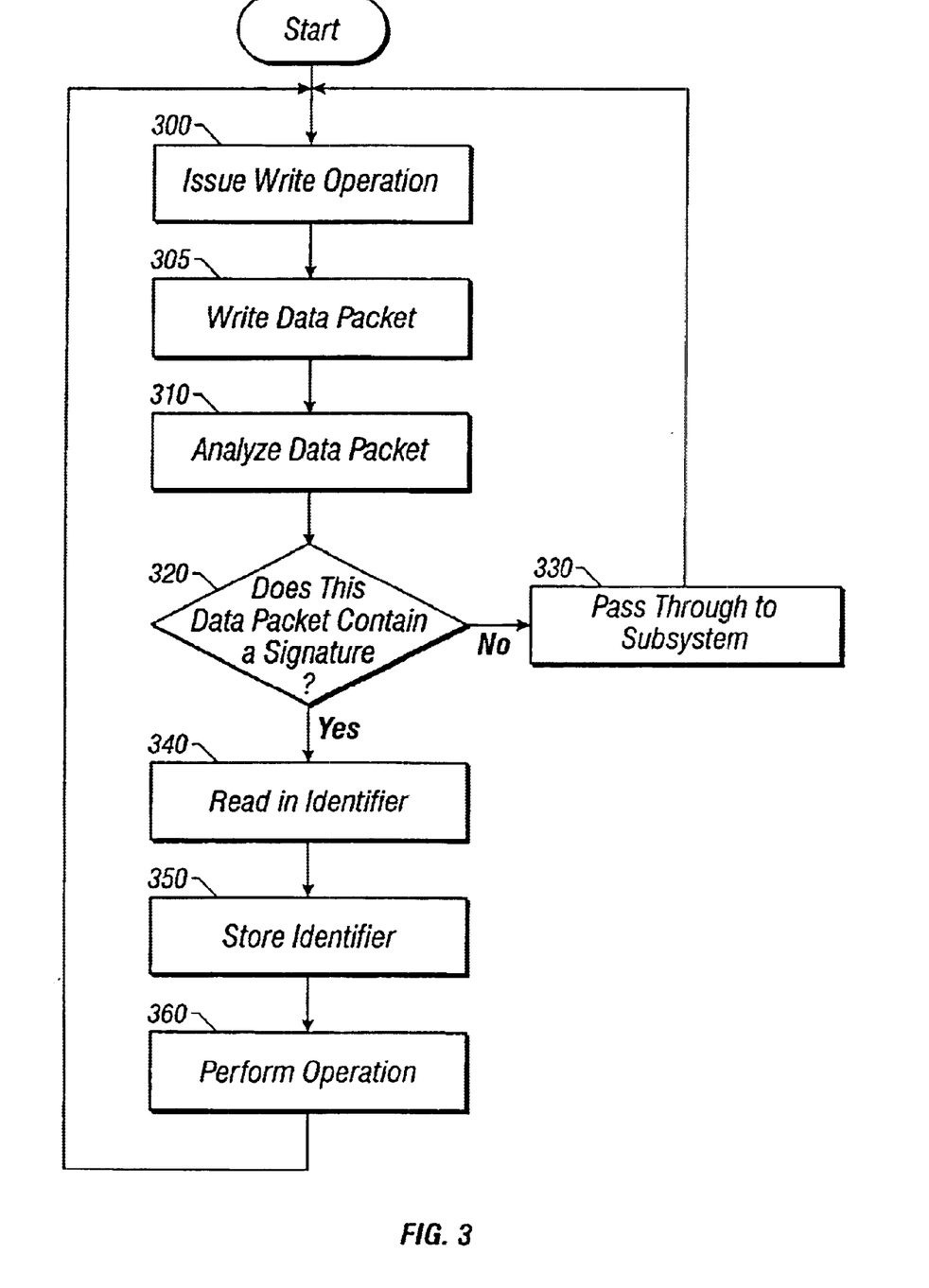
FIG. 3 depicts the steps of performing a write operation conforming to platform-independent subsystem protocol in accordance with one embodiment of the present invention.

FIG. 3 illustrates the steps performed in writing information to a subsystem from a host computer using a protocol according to the present invention. First, a write operation is issued by host computer 10 (step 300). This operation writes a data packet to subsystem 140 (step 305). Interface controller 130 receives this data packet and analyzes it to determine if the data packet contains a signature (step 310).

Interface controller 130 then determines if the data packet contains a signature pattern (step 320). If the data packet simply contains data to be written to subsystem 140, the data packet is passed through to subsystem 140 (step 330). However, if the data packet contains a signature (and so is a protocol command), the identifier contained in the data packet is read into interface controller 130 (step 340), which stores this information for future use (e.g., for use by a read operation) (step 350). The operation specified by the protocol command is then performed, if any such action needs to be taken (step 360).

With regard to the subsystem protocol read command, the subsystem controller distinguishes this command from standard read commands on the basis of its identifier (e.g., a logical block address (LBA) of the file or partition from which the command is to "read"). This identifier is preferably the same as that of the preceding subsystem protocol write command, which simplifies the protocol. Alternatively, out-of-order write-read pair processing may be supported by a protocol according to the present invention. For example, a protocol read command may read information generated by a protocol write command other than that generated by the immediately preceding protocol write command. In certain embodiments, the subsystem protocol application (or different subsystem protocol applications, if more than one is used) may read from different drives and addresses. The subsystem protocol application may read this information from the dedicated file or partition, or may request that the OS and subsystem driver perform a read-back of the data which was just written.

Figure 4:
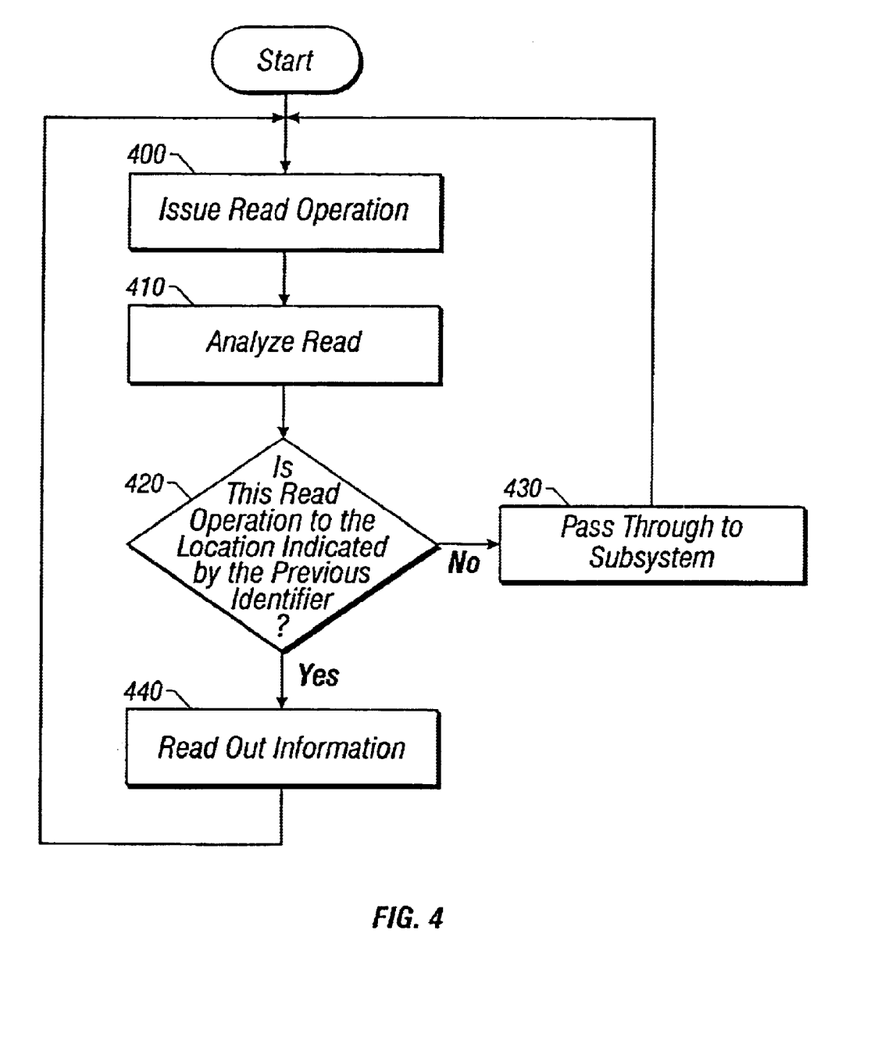
FIG. 4 depicts the steps of performing a read operation conforming to platform-independent subsystem protocol in accordance with one embodiment of the present invention.

FIG. 4 illustrates the steps performed in reading information from a subsystem into a host computer using a protocol according to the present invention. First, a read operation is issued by host computer 10 (step 400). Interface controller 130 receives this command and analyzes it (step 410). Interface controller 130 then determines whether the read is to a location identified by the identifier in a corresponding write command (i.e., if it contains the proper identifier) (step 410). If the data packet is simply a command to read data from subsystem 140, the read command is passed through to subsystem 140 for completion (step 430). However, if the data packet contains the proper identifier (and so is a protocol command), the identifier contained in the data packet is processed by interface controller 130, which responds to the read operation by providing the requested information (step 440). For example, this might be information generated by a corresponding write protocol command.

Preferably, protocol commands are arranged and issued in pairs. This might take the form of, for example, the issuance of a SCSI write command (a subsystem protocol write command) followed by the issuance of a SCSI read command (a subsystem protocol read command). In that case the data-out phase of the write command transfers the order descriptor block, parameters, and data to the subsystem. The data-in phase of the read command transfers the status, results, and data back to host application after carrying out the orders given in the write command. The subsystem orders and results are embedded in the data area of the subsystem protocol commands. Thus, the SCSI status (or other standard status information) regarding either the subsystem protocol write or read command is irrelevant to indicating that the subsystem protocol is operating properly.

The subsystem protocol commands are preferably issued in single-threaded fashion (i.e., all commands are issued and executed in-order). If issued in this manner, the write-read subsystem protocol command sequence described above is ensured. In a SCSI based subsystem, the SCSI check condition status command may cause the host SCSI driver or host operating system to make some attempt to retry the failed command. This situation should be detected by the subsystem controller to avoid the out-of-sequence execution of subsystem protocol commands.

In order to avoid the performance penalty of having to examine the data of every write command to see if it contains a signature pattern, one embodiment of the present invention uses two block long write and read commands as subsystem protocol commands. Any read or write which is not two blocks long (a relatively unusual size for most operating systems) is immediately eliminated from consideration as a possible subsystem protocol command. This reduces the workload of the subsystem controller analyzing the command stream.

Negligibly low probability of a random, unintentional match of the given signature pattern is also desirable. Thus, a comparatively long signature pattern should normally be employed. In order to avoid the performance penalty of verifying a long pattern in each subsystem protocol write command, as well as a reduction in bandwidth caused by the use of signatures of such length, one embodiment of the present invention does not actually put this long signature pattern in every subsystem protocol write command. Instead, a special subsystem protocol command called the subsystem protocol sign-on command is defined. This write command is a different size than other subsystem protocol commands (e.g., six blocks, rather than two), allowing subsystem protocol sign-on command to be distinguished from other subsystem protocol write commands without analyzing the command's data. Six blocks is also a relatively unusual size for most operating systems, maintaining ease of detection. The full signature pattern is present in this command and is verified by the subsystem controller. Once this is done, the subsystem protocol is "signed on" and subsequent subsystem protocol commands are identified by the fact that all write/read protocol commands have the same identifier (e.g., a given LBA) as the subsystem protocol sign-on command. This implementation has the additional advantage of allowing the subsystem controller to identify subsystem protocol write commands earlier (from the LBA) rather than later (from the data). There are a number of additional checks which may be performed on the data of a write command identified as being a subsystem protocol write command (from its LBA (and two-block length)). Should any of these checks fail, an exception condition occurs. In this case, the subsystem protocol may be flagged as being inoperative.

Subsystem protocol errors can, of course, occur. For example, disk caching can prevent a subsystem protocol read command from actually being sent to the subsystem controller. If caching is done in software, this condition must be sensed in the caching software; if done in hardware, the caching hardware must be modified when designing a controller taking advantage of the present invention. Dynamic relocation of disk files (for example by a background disk defragmentation task) can cause subsystem protocol commands to be sent to an LBA different from that used by the subsystem protocol sign-on command. Simultaneous execution of more than one subsystem protocol host program attempting to communicate with the same subsystem controller may also encounter problems, as can the failure to reserve the LBA used by the subsystem protocol from use by other applications. If the host's file system re-arranges, spreads, or duplicates the subsystem protocol commands, confusion can occur. This is especially true for systems that employ a single-thread approach. The above failures should be detected before any corruption of real data can occur.

In order to detect such failures at the earliest possible time, additional safeguards may be included. These safeguards include:

Short signature patterns in the data of all subsystem protocol write and read commands;

Checksum protection of information in subsystem protocol write and read commands;

Strict enforcement by the subsystem controller of the alternating write/read command pairs; and Incrementing sequence numbers in each subsystem protocol write and read command (0 in the subsystem protocol sign-on write command, 1 in its paired read command, 2 in the next subsystem protocol write command, 3 in its paired read command, and so on).

The subsystem controller may be configured to classify any write or read directed to the subsystem protocol address which is not 2 blocks long (and is not a new subsystem protocol sign-on write command) as a protocol violation. Whatever the cause, a protocol violation would, for example, immediately terminate the protocol, or another action could be taken to indicate the failure (e.g., a blinking light on the controller).

Protocol violations may be detected by either the subsystem controller or the host application. If detected by the subsystem controller, the command may be treated as though no subsystem protocol sign-on command was ever received and allow the storage media to be accessed normally. The subsystem controller would then remain in the signed-off state, until a new subsystem protocol sign-on command was received. The next time the host sent a subsystem protocol read command, data from the media (rather than specially formatted information from the subsystem controller) would be returned. This data would fail one or more of the host application's validity checks, thereby triggering an error in the host application (and so indicating a failure in the protocol).

Subsystem Communication Example

The following defines one embodiment of an apparatus designed according to the present invention. A serial loop interface controller (SLIC) is described which employs a communication protocol, application programming interface (API), and user interface according to the present invention. Of course, the present invention may be incorporated into other types of interface controllers, with the attendant benefits described herein. The host application that performs diagnostics on one or more disk drive units in this environment is referred to as a SLIC Diagnostic Utility (SDU). The SDU is designed to allow a small-computer systems interface (SCSI) host to communicate with an interface controller 130 through a SCSI interface (e.g., subsystem controller 36). In this example, a serial communications architecture is used to connect the subsystem to host computer 10. Specifically, a serial storage architecture (SSA) is used in this example, although other serial communications architectures could be used (e.g., a Fiber Channel Arbitrated Loop (FCAL)). Moreover, the present invention supports architectures other than the serial communications architecture discussed herein (e.g., parallel architectures).

In this embodiment, the host uses standard SCSI commands over the same interface to access the SSA devices within interface controller 130. The functions of the SDU include SLIC configuration, SSA administration, error diagnostics, microcode downloading, and other such functions. An SDU of the present invention may be implemented in at least two different ways by having the application software write to one or more of at least two different operating system constructs.

In one implementation, the application writes to and reads from a data file. By sending information to a data file (in, for example, a DOS environment), the information can be detected by interface controller 130, and acted upon in an appropriate manner. In another implementation, the application writes to and reads from a reserved partition (e.g., a "SLIC partition") created on a hard disk connected to interface controller 130 controller. This mechanism, referred to herein as the SDU Disk Partition (SDU-DP) technique, requires the host to reserve a SLIC partition exclusively for the SDU to communicate with the SLIC. Data read from and written to the SLIC partition should be interpreted by interface controller 130 according to the SLIC communication protocol. The SDU can then communicate with interface controller 130 using disk accesses and standard system calls, which maximizes portability by avoiding the use of platform-specific driver software. However, the host system needs to be correctly booted with SLIC-SSA drives attached before the SDU can be launched. This method would be appropriate in a UNIX environment, for example.

Alternatively, a vendor-unique approach may be employed in implementing a subsystem protocol according to the present invention. This might be done to allow communication with subsystems manufactured by a specific vendor that are capable of using a superset of the normal subsystem protocol commands (i.e., to provide vendor-specific subsystem protocol commands). For example, special read and write commands could be provided to allow easy identification of subsystem protocol commands. Alternatively, a pass-through command could be used to issue vendor-unique commands to a subsystem device of the vendor's manufacture, supported by the host system's device driver.

These vendor-unique commands can be filtered and interpreted as SDU communication commands. Although it is possible to support SCSI pass-through commands in a platform-specific manner, each implementation's interface would then differ from platform to platform. The SDU of such an approach would have to be ported and tested on each platform supported. This approach may be used to provide a PC-based service tool for off-line analysis of sub-systems without involving the real host system, but is antithetical to the idea of providing platform-independent support.

When the SDU-DP technique is used in a UNIX system, one or more SDU partitions are created by the system administrator on the hard disk being controlled. Preferably, these partitions are used exclusively by the SDU-DP program. The size of the SDU partition is preferably the minimum size that the host system allows in order to avoid needlessly wasting disk space. The SDU-DP program takes the form of a utility program running on the host system. When launched, the SDU-DP program locates the SDU partition on the hard disk from the configuration file provided by user and issues an SDU sign-on command to the subsystem controller (e.g., interface controller 130). The SDU sign-on command may be, for example, a three block raw data write to the SDU partition with a specific pattern in data area (i.e., a signature pattern). The SDU sign-on command turns on the SDU mode and sets the SDU-LBA (the logical block address used to communicate with the SDU). If a SCSI subsystem is being controlled, for example, the SDU-LBA is preferably the identifier (ID), logical unit number (LUN), and LBA combination from the sign-on command.

Once the SDU-LBA has been set, the application communicates with interface controller 130 by issuing a two block write command (SDU command) to the SDU-LBA. The SDU application preferably issues a two block read command to the SDU-LBA (e.g., an SDU read, after any SDU write, to retrieve the SDU status block) The syntax of the SDU status block may then be checked by the SDU-DP application. Any syntax error may be reported to user as possible conflict on the data partition. The issue of more than one sign-on command before sign-off is permitted, and makes possible the switching of the SDU-DP to an alternate SDU partition via an "updating" sign-on command.

When powering on interface controller 130, the SDU mode will normally be "off" and the SDU-LBA undefined. Any three block write command to any of the SLIC-SSA devices is subsequently intercepted and checked by the SLIC firmware to determine if it is a SDU sign-on command. When a sign-on command is detected, the SDU mode is changed to "on," the SDU sequence number (if used) is reset to zero and the SDU-LBA is set to the [ID, LUN, LBA] combination in the sign-on command.

During SDU mode, any two block write to the SDU-LBA is checked by interface controller 130. Assuming these write commands have the correct magic number (an arbitrarily chosen number, similar to a signature, that is used to ensure that the checksum is non-zero) and checksum (used to determine if the data is protocol data or simply random data), they are treated as SDU write commands. An SDU write command is not normally passed to the SSA device in this situation because it is intended as an SDU command, and not as data to be written to the SSA device. The two block read commands to the SDU-LBA are passed to the SSA device unless they are compliant with SDU protocol. These SDU-compliant read commands should be treated as SDU read commands and return the data generated by the SLIC being addressed.

A SLIC configured to employ the communication protocol of the present invention uses an SDU sign-on command to enable the SDU mode. During SDU mode, the SCSI read/write command accessing SDU at the location identified by ID/LUN/LBA (as before) should be checked against the SDU communication protocol parameters. The following example illustrates this checking for a preferred embodiment of the present invention:

the LBA of the SCSI command should be equal to the SDU-LBA, the transfer length of the SCSI command should be equal to 2, and for write commands, the magic number and the checksum should indicate a write command, according to the SDU command format, the sequence number in SDU command header should be incremented, and any SDU write command completed with a good status should be followed by an SDU read command. (No two contiguous SDU read or write commands are allowed in such an embodiment.)

In SDU mode, an SDU read command violating the SLIC protocol should be passed to the subsystem (e.g., a hard disk storage unit) controlled by the controller (e.g., a SLIC) and operate in the manner of a normal SCSI read command. The write command qualified by the preceding rules should not be passed to the subsystem. When an SDU protocol error is detected, the violation condition should be stored and an error status reported in subsequent SDU status blocks. The SLIC protocol violation condition should be held until another SDU sign-on process is successfully completed.

An exemplary SDU command block format is shown below:

| Byte Offset | Data | Description |
| --- | --- | --- |
| 0 | 0x5555aaaa | Magic number for command block |
| 4 | Seq # | Seq # for this command block |
| 8 | Cmd Code | SLIC Command Op Code |
| 12 | arg 0 | argument 0 |
| 16 | arg 1 | argument 1 |
| 20 | arg 2 | argument 2 |
| 24 | arg 3 | argument 3 |
| 28 | Checksum | Checksum (e.g., XOR 0:7 = 0) |
| 32–1023 | Data Area | Data |

The sequence number is reset to zero by the sign-on command and incremented by one for each SDU command received. The sequence number is checked by the SLIC as part of error checking in the SDU protocol. An exemplary SDU status block format is shown below:

| Byte Offset | Data | Description |
| --- | --- | --- |
| 0 | 0x5555aaaa | Magic Number for status block |
| 4 | Seq # + 1 | Incremented Seq # of the corresponding command block |
| 8 | Cmd Code | Command Code |
| 12 | Status | Status Code |
| 16 | Checksum | Checksum |
| 20–1023 | Data Area | Data |

Possible status codes in the SDU status block include the following:

| Status Code | Description |
| --- | --- |
| 0 | COMMAND COMPLETED WITHOUT ERROR |
| 1 | INVALID COMMAND |
| 2 | STATUS NOT READY |
| 3 | PROTOCOL ERROR |
| 4 | ILLEGAL REQUEST |

A Set of Exemplary SDU Commands

Based on the above SDU communication protocol, an exemplary SDU command API can be defined using the following format:

<command code> (arg0, arg1, arg2, arg3) struct rv { ... } where rv is the return structure for the command and is located in the SDU status block. Note that the first integer of the rv structure preferably contains the result for the command. A zero value indicates no error occurred in the command's execution. Other return values are command specific. While this exemplary SDU command API employs a syntax similar to the high-level language known as "C," other high-level languages, assembly codes, or other computer programming languages may be used to write software embodying the method of the present invention.

The most fundamental command in the protocol is the sign-on/sign-off command, which enables and disables the protocol. This is the only three block SDU command in this embodiment. When a message indicating that the command completed without error is returned in the SDU status block, a new communication session is enabled and the ID/LUN/LBA is stored to enable the identification of incoming SDU commands. The data field of the sign-on command repeats with a unique character string (such as "StartSDUUtility,"). When the sign-off command completes without error, the SDU mode is disabled.

The UPLOAD command uploads the SLIC firmware code. A QUERY_UPLOAD command is preferably issued in advance of the UPLOAD command, in order to configure the communication software. Downloading firmware is accomplished by first using a command such as the SETUP_DOWNLOAD command to inform the SLIC hardware about the size of the next SLIC firmware download. The last download sequence is then committed using the COMMIT_DOWNLOAD command, in which a delay is specified by the user. The user can specify the delay (in seconds) to be used in beginning the programming of the memory holding the downloaded information (e.g., a non-volatile memory such as flash RAM). Interface controller 130 preferably suspends communications when flash RAM programming starts, to allow the programming to proceed without the risk of unknowingly ignoring subsequent commands. Furthermore, interface controller 130 should self-reset after the completion of the download process. Interface controller 130 should not accept any SCSI command after the start of flash RAM programming unless a reset is completed.

The ABORT_DOWNLOAD command aborts the current download sequence. The user must first notify the subsystem controller to prepare for the download. A DOWNLOAD command is then issued to download a small portion of the image file at a time. The user can abort the download by using ABORT_DOWNLOAD. Otherwise, user should commit the download using COMMIT_DOWNLOAD. This SDU command invokes a delayed execution to a number of functions. Delay is normally specified in seconds. Immediately after command is issued, an indication that the timer is running should be given. Since the subsystem controller will not be accessible while running in this mode, a delay allows the operator to terminate the SDU function as well as other processes currently using the subsystem controller.

The diagnostic routines within interface controller 130 perform a series of internal self-tests. Usually, the test can be expected to complete within a short period of time. Interface controller 130 should then reboot itself. Afterwards, indications will be made if a loop is detected if an opened loop is detected. Hardware problems may also be indicated in this manner.

Interface controller 130 is designed to keep track of the connections and assigned addresses of all the connected SSA drives (i.e., to maintain a SCSI map). A reset command is provided to allow the user to erase this SCSI map and start anew. Interface controller 130 saves the information in non-volatile memory (e.g., flash RAM) such that it can operate properly after reboot and power-up. However, in some cases, it is desirable to start from a known state, which the reset command allows. The reset command queries product information from interface controller 130, providing information such as the original equipment manufacturer (OEM) that manufactured interface controller 130, hardware and firmware versions, serial number, and other information.

Two commands available to determine SSA web topology are QUERY_SSA and QUERY_TOPOLOGY. The QUERY_SSA command determines the status of node node_number and returns this information. The result is equal to −1 for a nonexistent node. The QUERY_TOPOLOGY command determines the topology of the SSA web. An array is used to contain the nodes connected to port 1 of interface controller 130, and another to contain the nodes connected to port 2 of the SLIC. A value of 0 or −1 in each array may be used to indicate the end of the sequence. When the sequence ends with 0 (home node), the topology is a loop. When the sequence ends with −1, the topology consists of two strings. A third array contains the node number that is currently in service mode.

Other query commands may also be supported. These commands include commands which return the node and logical unit number for each device attached to the SCSI communications channel, for example. Moreover, several SSA service commands may be implemented to permit the execution of various utility functions needed to operate the SSA nodes. During the normal operation of an SSA web, interface controller 130 should be a master to issue these commands. The first of these commands, SSA_SET_SERVICE, puts the node in service mode, and allows the service mode to be enabled and disabled. The instruction SSA_WEB_RESET starts the SSA web reset procedure. A SCSI pass-through command, PASS_THROUGH may also be provided to force the command to be passed through to the SCSI device connected thereto. Other commands may also be provided.

Exemplary Installation Procedure

As noted, a subsystem communication application according to the present invention may be installed on several different computing platforms with only minor alterations, and no alterations to the portions of the software which actually communicate with the subsystem. Moreover, because no special driver software is required to operate the subsystem communication application, the user is relieved from installing, configuring, and maintaining such software, a significant benefit. This software is referred to herein as SSA_SERV software. The following describes the installation of an the SSA_SERV software according to the present invention.

The SSA_SERV software assists a user in servicing an SSA subsystem attached to a SLIC. The service function may include features such as:

1. Firmware Download
2. Error Logging
3. Diagnostics
4. Disk administration

Examples of installation procedures are now given. Installing SSA_SERV software on a computer running a UNIX operating system may include one or more of the following steps. First, a new directory is created for the SSA_SERV software and the software extracted from removable media into this directory. Installation of the SSA_SERV software is then completed by running an installation script which copies the necessary files to various locations in the OS's filesystem, sets up configuration files, and further configures the software.

To use the SSA_SERV software, it is preferable to create at least one disk partition, called the SLIC partition, for the software's exclusive use. Multiple partitions may be provided to allow the application to switch to an alternate partition and remain operational, in the event that one partition is unavailable due to hardware problem or scheduled maintenance. These partitions are preferably created on different drives to provide added redundancy. Preferably, the last cylinder of the disk is reserved as the SLIC partition. Assigning the first cylinder of the disk for the SLIC partition should normally be avoided, as this may conflict with the OS's filesystem. The SLIC partitions created for use by the SSA_SERV software should be specified in a configuration file. The configuration file is preferably a text file and in the following format:

```
# Comment line has a # in the first column
# <SLIC dev name> <Raw disk partition path name>
nnn      /dev/rdsk/c1t0d0s7
nnn      /dev/rdsk/c1t1d3s7
``` where nnn is a string of up to 15 characters and represents the user-defined SLIC device's name.

When the SSA_SERV software is executed, it reads in data blocks in the communication area of the partition. In case SSA_SERV detects any protocol error, the original data is restored to the disk. This protects the user from corrupting data stored on the disk. This might occur, for example, when the device path name is entered incorrectly in the configuration file. For example, if the user specifies a local SCSI disk partition as the SLIC partition, the SLIC commands will be written to the disk directly. When SSA_SERV reads the status block, it will detect an error and restore the original data to the disk.

In the case of an installation in a PC operating system, the same basic procedure is followed, albeit with OS-specific adjustments. For example, the software is loaded onto a system drive and installed using a script or installation procedure. As before, a configuration file can be used to store configuration information. However, in this case a file is created (either by the user or the installation program) that the SSA_SERV software will use to write commands to and read data from, to support the given embodiment of the present invention. As before, multiple files could be used to provide redundancy.

Conclusion

Given the foregoing, it can be seen that the subsystem communication protocol of the present invention provides several benefits. A subsystem communication protocol such as that described herein permits an application employing this protocol to be used on several different platforms, merely by recompiling the application's source code. This greatly reduces the effort required to support subsystem communications on several different platforms. Not only does the present invention simplify the creation of such applications, it simplifies their use as well. Because an application employing the present invention requires no special device driver software to communicate with subsystem, the application's users are relieved of having to install and configure such driver software. The present invention thus simplifies both the creation and use of application software that must communicate with a computer subsystem.

The present invention also incurs minimal overhead in the transfer of control information between the CPU and the subsystem. Further, the present invention maintains simplicity in the hardware used to communicate between the CPU and the subsystem. Finally, the present invention offers a flexible approach which is not dependent on specific features of the given computing platform or operating system (OS), as noted above.

The invention has now been explained with reference to specific embodiments. Other embodiments will be apparent to those of ordinary skill in the art in view of the foregoing description. It is therefore not intended that this invention be limited except as indicated by the appended claims and their full scope of equivalents.

What is claimed is:

1. A method for communicating between a host computer and a subsystem controller comprising:
   sending data to a device driver, wherein
      said data comprising an identifier and a command,
      said device driver is configured to communicate said data to said subsystem controller, and
      said device driver is not configured to recognize said identifier;
   communicating said identifier and said command from said device driver to said subsystem controller;
   identifying said identifier by analyzing at least a portion of said data; and
   identifying said command as a protocol command using said identifier.

2. The method of claim 1, further comprising:
   if said command is identified as said protocol command, causing said subsystem controller to perform an action, and
   otherwise, passing said command to a device controlled by said subsystem controller.

3. The method of claim 2, wherein said protocol command is a sign-on command, and said identifying said command further comprises:
   identifying said protocol command as said sign-on command using at least one of (1) a length of data associated with said command, (2) a length of said command, (3) a signature pattern within said command, and (4) an address associated with said command.

4. The method of claim 3, wherein said identifying said command uses said address and said method further comprises:
   issuing a subsequent command from a host computer to said subsystem controller, said subsequent command containing further address information;
   identifying said subsequent command as one of a plurality of protocol commands by comparing said further address information with said address; and
   if said subsequent command is identified as said one of said plurality of protocol commands, causing said subsystem controller to perform a further action, and
   otherwise, passing said subsequent command to said device.

5. The method of claim 4, wherein said device is a storage device and said command and said subsequent command are storage device commands.

6. The method of claim 4, wherein said subsystem controller is a SCSI host adapter, said device is a SCSI hard disk drive, and said command and said subsequent command are SCSI commands.

7. The method of claim 2, wherein said command comprises said identifier.

8. The method of claim 2, wherein said subsystem controller is coupled to control a computer subsystem, and said method further comprises:
   writing to said computer subsystem using said identifier; and
   reading from said computer subsystem using said identifier.

9. The method of claim 8, wherein said writing comprises:
   communicating a write command from said device driver to said subsystem controller, said write command communicating first identifying information to said subsystem controller;
   identifying said write command as a protocol write command by comparing said first identifying information with said identifier; and causing said subsystem controller to perform said action, if said write command is identified as said protocol write command, and passing said write command to said computer subsystem, otherwise.

10. The method of claim 9, wherein said reading comprises:

communicating a read command from said device driver to said subsystem controller, said read command communicating second identifying information to said subsystem controller;

identifying said read command as a protocol read command by comparing said second identifying information with said identifier; and returning subsystem controller data from said subsystem controller to said host computer if said second identifying information matches said identifier.

11. The method of claim 1, wherein said command is a write command, said write command comprises said identifier, said identifier comprises identifying information, and said identifying said command further comprises:

determining if said write command is a protocol write command by analyzing said identifying information, wherein said subsystem controller is coupled to control a computer subsystem.

12. The method of claim 11, further comprising:

causing said subsystem controller to perform an action specified by said write command, if said write command is determined to be said protocol write command, and passing said write command to said computer subsystem, otherwise.

13. The method of claim 12, wherein said determining comprises:

detecting said identifying information; and comparing said identifying information with identification information stored in said subsystem controller.

14. The method of claim 12, wherein said method further comprises:

issuing a read command from said host computer to said subsystem controller, said read command containing further identifying information;

determining if said read command is a protocol read command using said further identifying information; and causing said subsystem controller to send a response to the host computer if said read command is identified as said protocol read command.

15. The method of claim 14, wherein said determining if said read command is said protocol read command comprises:

analyzing said read command by detecting said further identifying information, and comparing said further identifying information with identification information stored in said subsystem controller.

16. The method of claim 14, wherein said response comprises requested information generated by a previously-issued write command.

17. The method of claim 1, further comprising:

storing first identifying information in said subsystem controller, wherein said identifier comprises said first identifying information, and said subsystem controller is coupled to control a computer subsystem;

writing to said subsystem controller via said driver, wherein said driver resides on said host computer, said writing communicates second identifying information, and said second identifying information is used to identify protocol write commands; and reading from said subsystem controller via said driver, wherein said reading communicates third identifying information from said driver to said subsystem controller, and said third identifying information is used to identify protocol read commands.

18. The method of claim 17, wherein said writing comprises:

issuing a write command to said subsystem controller, said write command communicating said second identifying information to said subsystem controller;

identifying said write command as a protocol write command by comparing said second identifying information with said first identifying information; and causing said subsystem controller to perform an action, if said write command is identified as said protocol command, and passing said write command to said computer subsystem, otherwise.

19. The method of claim 17, wherein said reading comprises:

issuing a read command to said subsystem controller, said read command communicating third identifying information to said subsystem controller;

identifying said read command as a protocol read command by comparing said third identifying information with said first identifying information, said read command being identified as a protocol read command if said third identifying information matches said first identifying information; and returning subsystem controller data from said subsystem controller to said host computer, if said read command is identified as a protocol read command.

20. The method of claim 1, further comprising:

writing a data packet to said subsystem controller via said device driver, wherein said data packet comprises first identifying information and second identifying information, and said subsystem controller is coupled to control said computer subsystem;

comparing said first identifying information to stored identifying information, wherein said stored identifying information is stored in said subsystem controller;

storing said second identifying information in said subsystem controller, if said first identifying information matches said stored identifying information, and passing said data packet to said computer subsystem, otherwise; and reading from said subsystem controller via said device driver using said second identifying information.

21. The method of claim 20, wherein said writing comprises issuing a write command to said subsystem controller, said write command causing said data packet to be written to said subsystem controller, and said method further comprises:

detecting said first identifying information.

22. The method of claim 20, wherein said reading comprises:
issuing a read command to said subsystem controller, said read command including third identifying information;
comparing said third identifying information with said second identifying information; and
returning information from said subsystem controller to said host computer if said third identifying information matches said second identifying information.

23. A computer system comprising:
a host computer, comprising a processor;
a subsystem controller, coupled to said host computer;
computer readable medium coupled to said processor; and
computer code, encoded in said computer readable medium, configured to cause said processor to:
send data to a device driver, wherein
said data comprising an identifier and a command,
said device driver is configured to communicate said data to said subsystem controller, and
said device driver is not configured to recognize said identifier;
communicate said identifier and said command from said device driver to said subsystem controller;
identify said identifier by analyzing at least a portion of said data; and
identify said command as a protocol command using said identifier.

24. A computer program product encoded in computer readable media, said computer program product comprising:
a first set of instructions, executable on a computer system, configured to send data to a device driver, wherein
said data comprising an identifier and a command,
said device driver is configured to communicate said data to said subsystem controller, and
said device driver is not configured to recognize said identifier;
a second set of instructions, executable on said computer system, configured to communicate said identifier and said command from said device driver to said subsystem controller;
a third set of instructions, executable on said computer system, configured to identify said identifier by analyzing at least a portion of said data; and
a fourth set of instructions, executable on said computer system, configured to identify said command as a protocol command using said identifier.

25. An apparatus for communicating between a host computer and a subsystem controller comprising:
means for sending data to a device driver, wherein
said data comprising an identifier and a command,
said device driver is configured to communicate said data to said subsystem controller, and
said device driver is not configured to recognize said identifier;
means for communicating said identifier and said command from said device driver to said subsystem controller;
means for identifying said identifier by analyzing at least a portion of said data; and
means for identifying said command as a protocol command using said identifier.

26. An interface controller comprising:
a recognition unit, wherein
said recognition unit is configured to receive an identifier and a command, and
said recognition unit is configured to identify said command as a protocol command based on said identifier; and
an interface controller unit, wherein
said recognition unit is configured to cause said interface controller to perform an action, if said command is identified as said protocol command.

27. The apparatus of claim 17, wherein
said interface controller is configured to pass said command to a device controlled by said interface controller, if said command is not identified as said protocol command.

28. The apparatus of claim 27, wherein
said recognition unit is coupled to a host computer by a data line,
said data line is capable of carrying said identifier.

29. The apparatus of claim 28, wherein
said data line is further capable of carrying said command.

30. The apparatus of claim 28, wherein
said data line is further configured to carry data from said host computer to said device.

31. The apparatus of claim 27, wherein
said recognition unit is coupled to a host computer by a first data line,
said recognition unit is coupled to said device by a second data line, and
said first data line is capable of carrying said identifier.

32. The apparatus of claim 31, wherein
said first data line is further capable of carrying said command.

33. The apparatus of claim 27, wherein
said device is coupled to a host computer by a data line,
said recognition unit is coupled to said data line, and
said data line is capable of carrying said identifier.

34. The apparatus of claim 33, wherein
said data line is further capable of carrying said command.

35. The method of claim 27, wherein
said protocol command is a sign-on command, and
said recognition unit is configured to identify said protocol command as said sign-on command using at least one of (1) a length of data associated with said command, (2) a length of said command, (3) a signature pattern within said command, and (4) an address associated with said command.

36. The method of claim 35, wherein
said recognition unit is configured to identify said protocol command using said address, and
said recognition unit is further configured to
receive a subsequent command at said interface controller, said subsequent command containing further address information;
identify said subsequent command as one of a plurality of protocol commands by comparing said further address information with said address; and
if said subsequent command is identified as said one of said plurality of protocol commands, cause said interface controller to perform a further action, and otherwise, pass said subsequent command to said device.

37. The method of claim 27, wherein in said identifier is included in said command.

38. The method of claim 27, wherein said interface controller is coupled to control a computer subsystem and said recognition unit is further configured to:

write to said subsystem using said identifier; and read from said subsystem using said identifier.

39. The method of claim 38, wherein said recognition unit is further configured to write by virtue of being configured to:

issue a write command to said interface controller, said write command communicating first identifying information to said interface controller;

identify said write command as a protocol write command by comparing said first identifying information with said identifier; and cause said interface controller to perform said actions if said write command is identified as said protocol write command, and pass said write command to said computer subsystem, otherwise.

40. The method of claim 39, wherein said recognition unit is further configured to read by virtue of being configured to:

issue a read command to said interface controller, said read command communicating second identifying information to said interface controller;

identify said read command as a protocol read command by comparing said second identifying information with said identifier; and return interface controller data from said interface controller, if said second identifying information matches said identifier.

41. A method of communicating with a subsystem controller comprising:

receiving an identifier and a command at said subsystem controller;

identifying said command as a protocol command based on said identifier; and if said command is identified as said protocol command, causing said subsystem controller to perform an action, and otherwise, passing said command to a device controlled by said subsystem controller.

42. The method of claim 41, wherein said protocol command is a sign-on command and said identifying further comprises:

identifying said protocol command as said sign-on command using at least one of (1) a length of data associated with said command, (2) a length of said command, (3) a signature pattern within said command, and (4) an address associated with said command.

43. The method of claim 42, wherein said identifying said protocol command uses said address and said method further comprises:

receiving a subsequent command at said subsystem controller, said subsequent command containing further address information;

identifying said subsequent command as one of a plurality of protocol commands by comparing said further address information with said address; and if said subsequent command is identified as said one of said plurality of protocol commands, causing said subsystem controller to perform a further action, and otherwise, passing said subsequent command to said device.

44. The method of claim 41, wherein said subsystem controller is coupled to control a computer subsystem and said method further comprises:

writing to said subsystem using said identifier; and reading from said subsystem using said identifier.

45. The method of claim 44, wherein said writing comprises:

issuing a write command to said subsystem controller, said write command communicating first identifying information to said subsystem controller;

identifying said write command as a protocol write command by comparing said first identifying information with said identifier; and causing said subsystem controller to perform said action, if said write command is identified as said protocol write command, and passing said write command to said computer subsystem, otherwise.

46. The method of claim 45, wherein said reading comprises:

issuing a read command to said subsystem controller, said read command communicating second identifying information to said subsystem controller;

identifying said read command as a protocol read command by comparing said second identifying information with said identifier; and returning subsystem controller data from said subsystem controller, if said second identifying information matches said identifier.

47. A computer program product encoded in computer readable media, said computer program product comprising:

a first set of instructions, executable on a computer system, configured to receive an identifier and a command at a subsystem controller;

a second set of instructions, executable on said computer system, configured to identify said command as a protocol command based on said identifier;

a third set of instructions, executable on said computer system, configured to cause said subsystem controller to perform an action, if said command is identified as said protocol command; and a fourth set of instructions, executable on said computer system, configured to pass said command to a device controlled by said subsystem controller, if said command is not identified as said protocol command.

48. An apparatus for communicating with a subsystem controller comprising:

means for receiving an identifier and a command at said subsystem controller;

means for identifying said command as a protocol command based on said identifier;

means for causing said subsystem controller to perform an action, if said command is identified as said protocol command; and means for passing said command to a device controlled by said subsystem controller, if said command is not identified as said protocol command.

49. A method of communicating with a subsystem controller using a protocol, said method comprising:

receiving a write command at a subsystem controller, wherein said write command contains identifying information and said subsystem controller is coupled to control a computer subsystem;

determining if said write command is a protocol write command by analyzing said identifying information, said protocol write command being one of a plurality of commands of said protocol; and causing said subsystem controller to perform an action specified by said write command, if said write command is determined to be said protocol write command, and to pass said write command to said computer subsystem, otherwise.

50. The method of claim 48, wherein said determining comprises:
   detecting said identifying information; and
   comparing said identifying information with identification information stored in said subsystem controller.

51. The method of claim 48, wherein said method further comprises:
   receiving a read command at said subsystem controller, said read command containing further identifying information;
   determining if said read command is a protocol read command using said further identifying information, said protocol read command being another of said commands of said protocol; and
   causing said subsystem controller to send a response, if said read command is identified as said protocol read command.

52. The method of claim 50, wherein said determining if said read command is said protocol read command comprises analyzing said read command by:
   detecting said further identifying information; and
   comparing said further identifying information with identification information stored in said subsystem controller.

53. A computer program product for communicating with a subsystem controller using a protocol and encoded in computer readable media, said computer program product comprising:
   a first set of instructions, executable on a computer system, configured to receive a write command at a subsystem controller, wherein said write command contains identifying information and said subsystem controller is coupled to control a computer subsystem;
   a second set of instructions, executable on said computer system, configured to determine if said write command is a protocol write command by analyzing said identifying information, said protocol write command being one of a plurality of commands of said protocol; and
   a third set of instructions, executable on said computer system, configured to causing said subsystem controller to perform an action specified by said write command, if said write command is determined to be said protocol write command, and to pass said write command to said computer subsystem, otherwise.

54. An apparatus for communicating with a subsystem controller using a protocol, said method comprising:
   means for receiving a write command at a subsystem controller, wherein said write command contains identifying information and said subsystem controller is coupled to control a computer subsystem;
   means for determining if said write command is a protocol write command by analyzing said identifying information, said protocol write command being one of a plurality of commands of said protocol;
   means for causing said subsystem controller to perform an action specified by said write command, if said write command is determined to be said protocol write command; and
   means for causing said subsystem controller to pass said write command to said computer subsystem, if said write command is determined not to be said protocol write command.

55. A computer system comprising:
   a host computer, comprising a processor;
   a subsystem controller, coupled to said host computer;
   computer readable medium coupled to said processor; and
   computer code, encoded in said computer readable medium, for communicating with a subsystem controller using a protocol and configured to cause said processor to:
      receive a write command at a subsystem controller, wherein said write command contains identifying information and said subsystem controller is coupled to control a computer subsystem;
      determine if said write command is a protocol write command by analyzing said identifying information, said protocol write command being one of a plurality of commands of said protocol; and
      cause said subsystem controller to perform an action specified by said write command, if said write command is determined to be said protocol write command, and to pass said write command to said computer subsystem, otherwise.

* * * * *